United States Patent
Schwinghammer

(12)
(10) Patent No.: US 6,524,479 B2
(45) Date of Patent: Feb. 25, 2003

(54) PLEATED FILTER ELEMENT WITH MELT-BONDED SUPPORT ROD AND METHOD OF MAKING SAME

(75) Inventor: Alfons Schwinghammer, Dingolfing (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 149 days.

(21) Appl. No.: 09/797,853

(22) Filed: Mar. 5, 2001

(65) Prior Publication Data

US 2001/0025815 A1 Oct. 4, 2001

(30) Foreign Application Priority Data

Mar. 4, 2000 (DE) .......................................... 100 10 710

(51) Int. Cl.⁷ ............................................... B01D 27/06
(52) U.S. Cl. ................................ 210/493.1; 210/493.3; 210/493.5; 264/248; 264/449; 264/DIG. 48; 493/392; 493/941
(58) Field of Search ............................. 210/483, 493.1, 210/493.2, 493.3, 493.5; 264/248, 252, 445, 449, DIG. 48; 493/374, 379, 392, 941

(56) References Cited

U.S. PATENT DOCUMENTS

| 3,458,979 A | 8/1969 | Davis et al. |
| 4,042,358 A | 8/1977 | Frohmader |
| 4,547,950 A | 10/1985 | Thompson |

FOREIGN PATENT DOCUMENTS

| EP | 0788823 | 8/1997 |
| GB | 873130 | 7/1961 |

*Primary Examiner*—Robert Popovics
(74) *Attorney, Agent, or Firm*—Crowell & Moring LLP

(57) ABSTRACT

A filter element 10 for purifying fluids having a filter medium 11, an enclosure member 12, and a rod 13. The filter medium 11 has folds 14, which may be zigzag-shaped, and which define a fold height 15 and a pleat surface 16. At right angles to folds 14 extend end faces 17, which represent the course of the folds 14. The enclosure members 12 are arranged on the end faces 17. To support the folds 14, the rod 13 pierces through the pleat surfaces 16 of the folds 14 creating joints 19. These joints 19 are sealed, e.g., by additional seals or by fusing the filter medium to the support rod or the support rod to the filter medium.

8 Claims, 5 Drawing Sheets

PLEATED FILTER ELEMENT WITH MELT-BONDED SUPPORT ROD AND METHOD OF MAKING SAME

BACKGROUND OF THE INVENTION

The invention relates to a filter element comprising a folded filter material and a support for the folds of the filter material. The invention further relates to a process for producing a filter element with supported filter medium folds.

German patent no. DE 198 16 238 discloses a plate-shaped filter element, which is provided with a stiffening strip for a filter medium folded into a zigzag shape. This stiffening strip fixes the position of the folds in relation to one another. For this purpose the stiffening strip is designed as a comb provided with a continuous bar and teeth starting from said bar. The teeth serve to receive the folds in form-fit manner. To clamp the folds in a non-positive fit, spring clips are provided, which are formed by adjacent teeth. The bar of the stiffening axis is elastic and flexible in the longitudinal plane formed by the teeth. The stiffening strip has substantially greater resistance against lateral buckling.

This comb, however, due to its teeth and the spring clips formed by the teeth, is a component that is complex and expensive to produce. Furthermore, the teeth must match the folds of the filter element exactly, so that filter elements having different fold heights or fold spacing require a separate comb. Furthermore, the comb, due to its geometry, can only be used for a filter element of a certain length. For filter elements with different lengths, different combs are required.

SUMMARY OF THE INVENTION

It is therefore the object of the invention to provide a filter element with folds and a support for the folds.

Fit is also an object of the invention to provide a fold support member made of a simple, variably usable and inexpensive semi-finished product which nevertheless supports the folds reliably.

These and other objects are achieved in accordance with the invention by providing a filter element for purifying a fluid comprising at least one filter medium having folds defining pleat surfaces, an enclosure member applied to each end face of the folds, and a support for the folds comprising at least one rod which pierces the pleat surfaces of the folds, wherein joints between said at least one rod and the pleat surfaces are sealed.

In accordance with a further aspect of the invention, the objects are achieved by providing a process for producing a filter element in which joints between a pleated filter medium and a support rod piercing pleat surfaces of the filter medium are melting zones in which the rod is melted to the filter medium or the filter medium is melted to the rod, said process comprising placing the filter medium in a pleat folding device having a recess through which the rod pierces the filter medium, passing a rod through the recess to pierce the pleat surfaces of the filter medium, and connecting the rod to a voltage source and passing an electric current through the rod to generate heat and melt the rod to the filter medium or the filter medium to the rod.

The filter element according to the invention is formed by a filter medium provided with folds, a enclosure member arranged at the end faces, and a support for the folds. It is advantageously suited reliably to support the folds by said support, which is made of a simple, variably usable and inexpensive semi-finished product.

The filter medium has folds with fold areas or pleat surfaces and fold heights and end faces that extend at right angles to the folds and represent the course of the folds. The height of the folds can differ in various types of folding. Conceivable, for instance, is a W-shaped folding in which only every second fold has the same height. Other types of folding that partition the filter element, e.g., into segments, can have folds of the same height in one segment and greater or smaller fold heights in an adjacent segment.

The enclosure members are arranged at the end faces and fix the folds along the end faces. To fix the folds, a material is required that will withstand the loads of a fluid flowing through the filter. The enclosure members may, for instance, be made of a thermoplastic synthetic resin or of an elastomer.

The support for the folds may advantageously be formed by a rod, which pierces the surfaces of the pleats of the folds of the filter medium. This creates joints between the rod and the filter medium. By piercing the rod through the pleat surfaces, the folds are held at their fold height at the joints. The folds are axially moveable on the rod. The rod may have any shape and size with respect to its cross sectional area. The rod may further have a smooth or structured surface. Structured surfaces may take the form, for instance, of grooves or elevations extending lengthwise or crosswise to the rod axis and may extend over only a portion of the surface or over the entire surface. The rod cross sectional area may, for example, be square, rectangular, triangular, or hexagonal, while the size of the cross sectional area may be freely selected. It is most advantageously selected as a function of the pleat surface area. If the pleat surface areas are small, the cross sectional area of the rod should be small, if the folds are large, then a rod with a large cross sectional area may be selected. The rod may further be designed to be flexible so that it can follow various curves, e.g., a circle or an arc. The strength of the rod should be selected as a function of the application. If a rigid filter element is required, a high-strength rod should be selected, if a flexible filter element is required, a low-strength rod should be selected. If the filter element requires greater stability than provided by the enclosure member at the end faces and a single rod, several rods may pierce through the filter medium. This increases the stability considerably. This support of the folds, either with a single rod or with several rods, may be used for filter elements of a wide variety of shapes, e.g., rectangular, triangular, round, tapered, cylindrical or oval filter elements.

Since the support member for the folds takes the form of a rod, the rod can be used universally for different fold heights and fold spacings. The rod is moreover an inexpensive semi-finished product, which can be cut to any required length. Unwinding the rod from a coil or spool, for instance, makes it possible to realize a continuous production process to increase economic efficiency. To this end, a device should be provided that cuts the rod at a defined point. Depending on the desired characteristics, the rod may be made, for instance, of metal or synthetic resin material (i.e., plastic).

The filter medium can be filter paper, for example, which may be treated. To prevent undefined tears in the filter medium when pierced by the rod, the filter medium may be provided with a punched hole through which the rod is pushed. The inside contour of this hole may be slightly smaller than the outside contour of the rod, so that the rod fits tightly against the filter medium. If the inside contour of the hole is larger than the outside contour of the rod, a seal may be threaded onto the rod to effect sealing between filter medium and rod.

Other filter media, e.g., fibers with a fiber structure, may be pierced directly by the rod since the rod pushes the fibers aside and the fiber structure fits tightly against the rod.

One advantageous embodiment of the inventive concept is to form the folds into a zigzag shape so that the folds of the filter medium all have the same fold height. In this embodiment the folds always may be pierced at the same height so that each fold receives the same amount of support. In folds with different fold heights, the higher fold is pierced, for instance, in the lower fold region and the lower fold in the upper fold region, which produces variable strengths of the folds.

It is advantageous if the rod pierces the fold height through the center, so that the folds are uniformly supported. Through this central positioning of the rod, the filter medium can offer greater resistance against pulsating flows of fluid, since the folds have the same amount of support in either direction.

One particular embodiment of the invention provides for the use of a synthetic nonwoven material or fabric web as the filter medium. This has the advantage that the synthetic fibers are pushed apart by the rod and fit tightly against the rod for a sealing effect without an additional seal.

According to a further embodiment of the invention, the rod has a circular cross sectional area. This ensures the best seal between filter medium and rod. A rod with a round cross sectional area is furthermore inexpensive, easy to process and stable.

It is advantageous if the junctions or joints between the support rod and folds or pleat surfaces are locally fixed so that the folds can no longer move back and forth on the rod. This fixation can be accomplished, for instance, by an adhesive applied to the joints. It is also possible to use a hot-melt adhesive that is applied to the rod. Only after the rod has been pushed through the folds is the heat necessary for the reaction of the hot-melt adhesive applied from an external source, e.g., by means of an oven. As a result, the filter medium is firmly connected to the rod only at the joints, so that no excess adhesive is applied to those filter areas that do not come into contact with the rod.

An advantageous embodiment of the inventive concept is the use of an electrically conductive rod. Using an electrically conductive rod made, for instance, of metal makes it possible to generate heat by applying a voltage. This heat can be used to produce, for instance, the reaction heat required for the hot-melt adhesive.

A further variant of the invention uses a rod made of synthetic resin material. This rod is joined to the filter medium by applying an adhesive or a hot-melt adhesive. To make the synthetic resin rod electrically conductive, additives, such as metal powders, carbon black or graphite, may be mixed into the synthetic resin material. Thus, the hot-melt adhesive can again be brought to the reaction temperature by applying a voltage to the synthetic resin rod.

One advantageous embodiment of the invention provides that the joints between rod and filter medium are formed by melt zones. The temperature present in the rod causes either the rod and/or the filter medium, if the latter is made of a fusible material, to partially melt and form a tight joint connecting the filter medium with the rod after the fusible material cools. To this end the rod may be only partly melted along its circumferential layer and have a continuous rod core. Thus, the rod core supports the filter medium. Through the partly melted circumferential layer, the filter medium, without being melted, is joined to the rod. In a different pairing of materials, the filter medium may be partly melted and thus joined to the rod to form a seal.

The rod may also be completely melted and consist only of rod segments so that there is no longer any continuous region of the rod. In this latter embodiment the rod segments are then supported against the filter medium and thus cause the spacing between the folds.

A process for producing a filter element in which a rod made of synthetic resin material forms the fold support and the joints are made as melting zones comprises the use of a device for folding the filter medium and piercing it with the rod. This device consists of several sections and essentially comprises a lower mold part, an upper mold part and voltage connections. The lower mold part comprises a lower fold molding region, which in conjunction with the upper fold molding region, determines the fold contour. The filter medium is placed on the lower mold part when the mold halves formed by the lower mold part and the upper mold part are spaced at a distance from one another. The mold halves are then placed on top of one another under defined conditions so that the filter medium is brought into its folded state. Subsequently the rod is pushed through the folds. To be able to remove the filter medium together with the rod piercing it from the device, the mold halves may have different designs.

One variant provides a recess in the two mold halves of sufficient width to accommodate the rod. This makes it possible to remove the filter medium with the rod after processing. A second possibility for removing the filter medium with the rod is provided by a two-part design of the mold halves with a left mold segment and a right mold segment. Until the folds of the filter medium have been produced, both mold segments of the lower mold half and both mold segments of the upper mold half fit against one another. After the folds have been produced, the two parts of the lower and the upper mold half are moved apart by a displacement unit, so that a gap is created. This gap is selected just large enough so that the rod can slide through during piercing. In this embodiment the two mold segments of the mold halves provide sufficient support for the filter medium so that the folds are not appreciably deformed when pierced by the rod.

After the rod has been pushed through the pleats of the filter medium, the two rod ends are connected to the voltage terminals. The voltage is then applied so that an electric current flows to heat the rod, which is made of synthetic resin material. This heat melts the plastic of the rod and forms the melting zones between rod and filter medium. After the melting zones have sufficiently cooled, the upper mold half is lifted from the lower mold half, which can of course be done automatically, and the folded filter element with the rod can be removed.

One preferred embodiment of the apparatus contains other components provided for automatically applying the enclosure members.

These and other features of preferred embodiments of the invention are set forth in the claims as well as in the specification and the drawings, and the individual features may be implemented either alone or jointly in subcombinations in embodiments of the invention or in other fields of use and may represent advantageous embodiments that are themselves protectable, and for which protection is hereby claimed.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
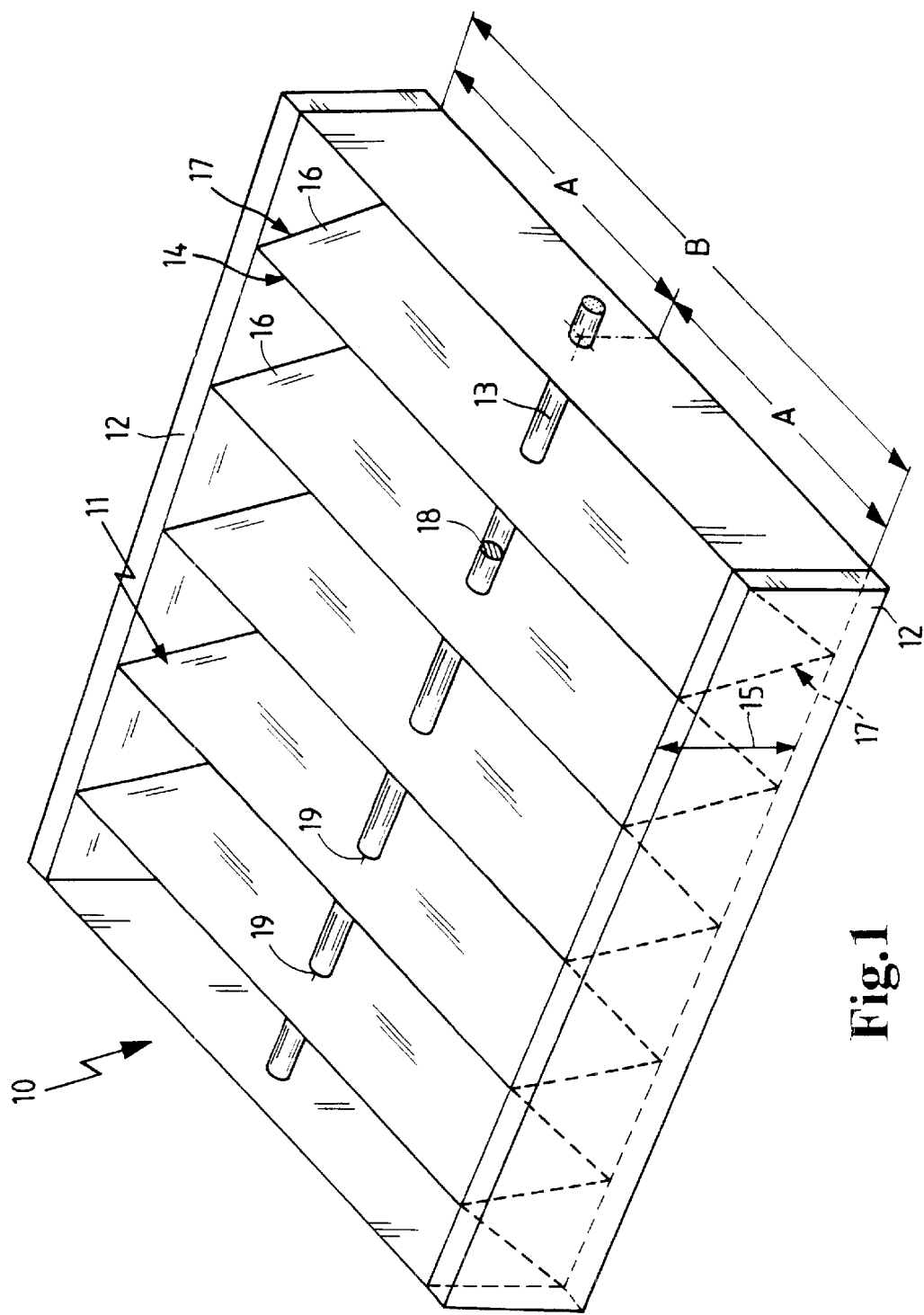
FIG. 1 shows a perspective view of a filter element according to the invention.

FIG. 1 depicts a rectangular filter element 10. Filter element 10 comprises a filter medium 11, a enclosure member 12 and a rod 13. The filter medium 11 has zigzag-shaped folds 14 with defined fold heights 15 and fold areas or pleat surfaces 16. End faces 17 extend at right angles to the folds 14. The end faces 17 represent the course of the folds 14 and limit the filter medium 11 in its width B. Width B extends parallel to the folds. The enclosure member 12 is arranged at the end faces 17 and thus forms an edge of filter element 10. In this embodiment enclosure member 12 is made of an elastomer mixture connected to the filter medium 11 to form a seal and to fix folds 14 in the shape of their contour.

The rod 13 has a circular cross sectional area 18 and is positioned in the center of the fold height 15 to produce an optimal support of the folds per se. To keep the folds at a defined distance from one another, rod 13 is positioned in the center between the two parts of the enclosure member 12, which is represented as the distance A, where A equals B/2. In very wide filter elements it may be necessary to insert several rods 13, which may be spaced at equal or different distances from one another and from enclosure member 12.

Rod 13 together with filter medium 11 forms joints 19. In this embodiment joints 19 correspond to melting zones, which are formed by melting the rod 13 and the filter medium 11. Joints 19 are made in such a way that rod 13 forms a tight joint 19 together with filter medium 11. Joint 19 must be at least as tight as the filter medium 11 so that no unfiltered dirt particles can pass through the filter element 10.

Figure 2:
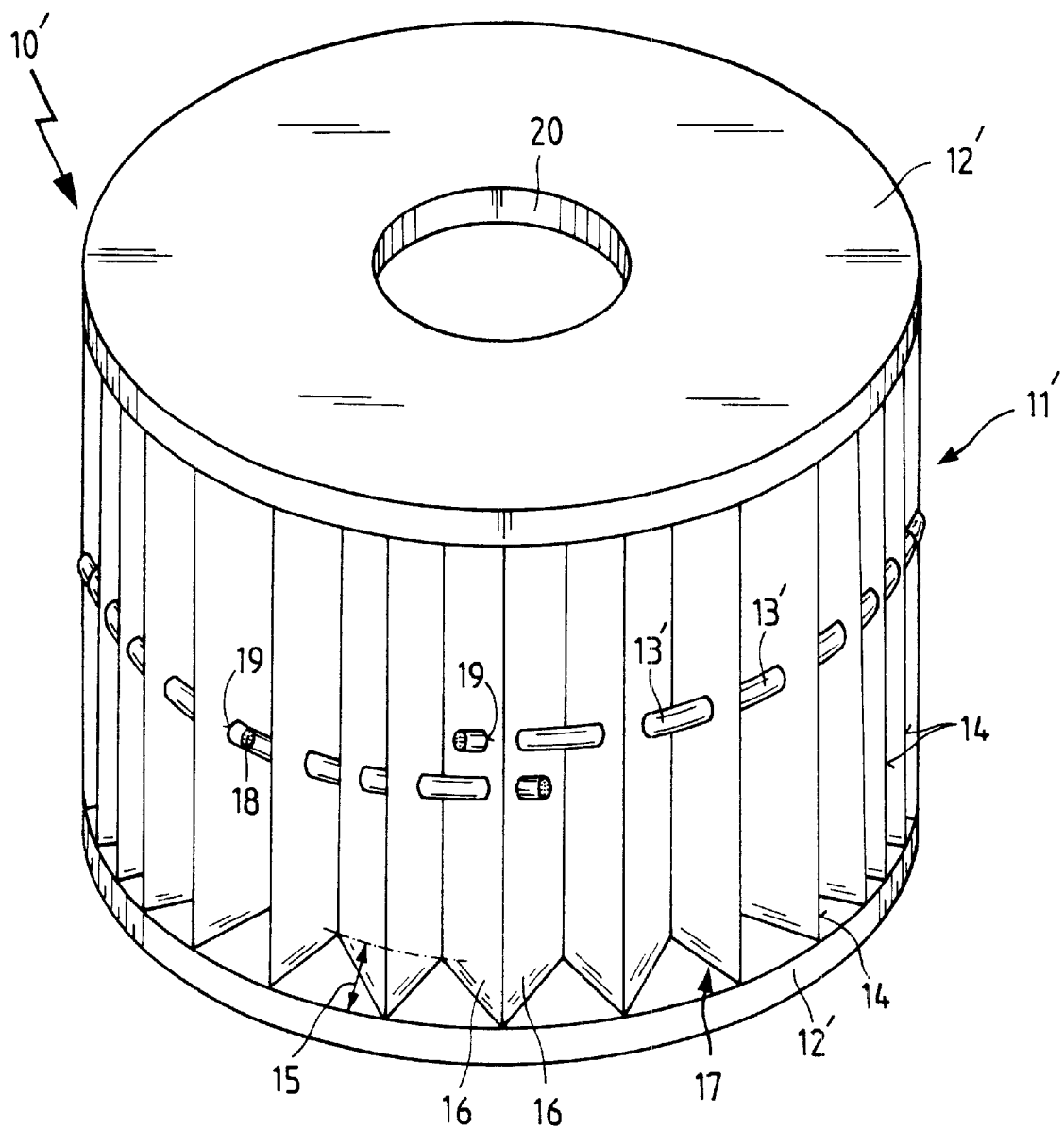
FIG. 2 shows a perspective view of a cylindrical filter element.

FIG. 2 shows a cylindrical filter element 10', which is structured analogously to that shown in FIG. 1. The enclosure member 12' is made in two parts and is circular. At least one part of enclosure member 12' has a centrally disposed circular opening 20. Enclosure member 12' is tightly connected with the filter medium 11'. When rod 13 pierces folds 14 of the filter medium 11', care must be taken, however, that rod 13' is radially guided in a spiral. This may be accomplished by a using previously preformed rod 13', or by bending rod 13' into the required contour as it is being pushed through the filter medium.

Figure 3:
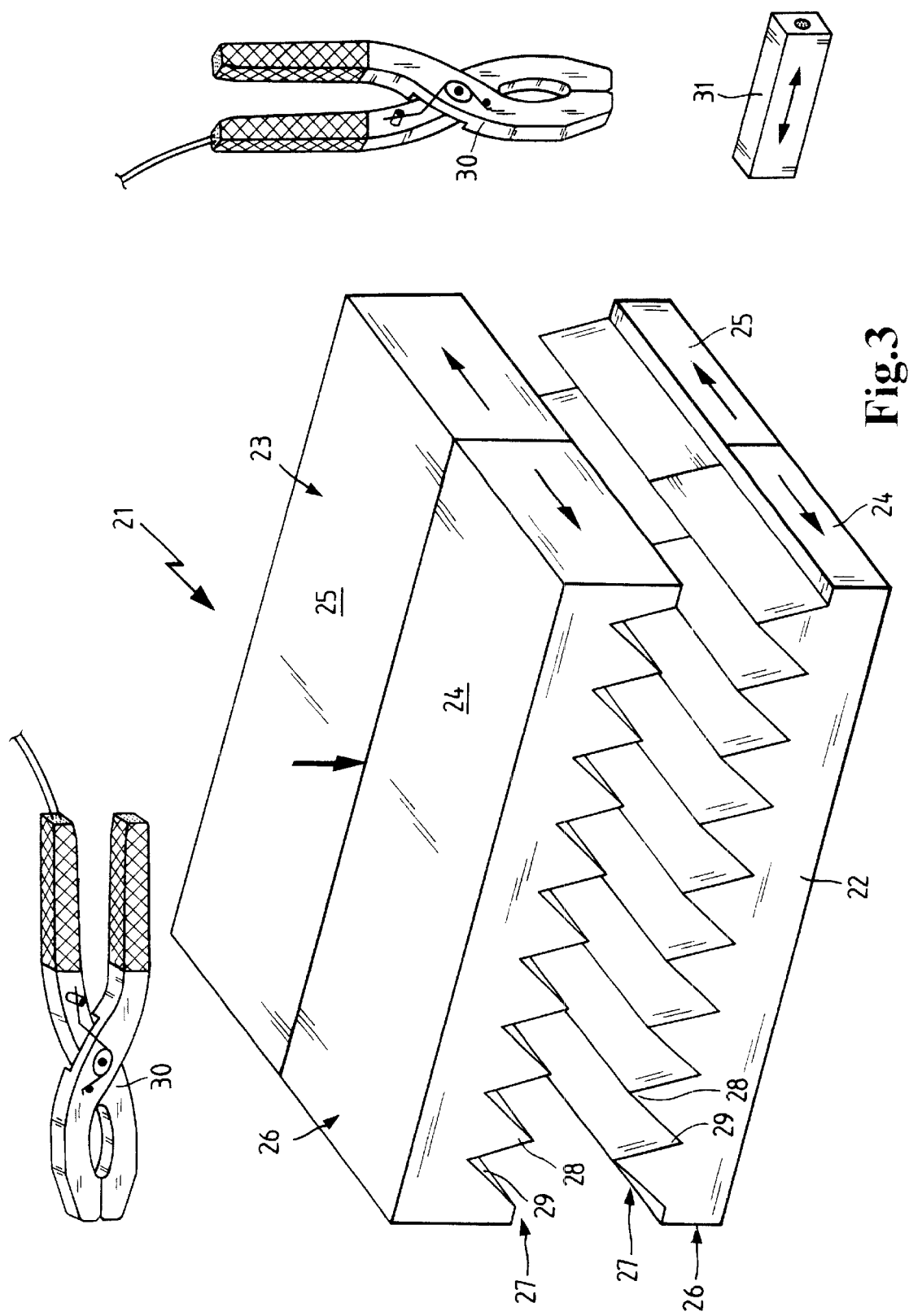
FIG. 3 shows a a perspective view of a device for producing a supported filter according to the invention.

FIG. 3 shows a perspective view of a device 21 for producing a supported filter according to the invention. The device 21 has a lower mold half 22 and an upper mold half 23. Each of the mold halves 22, 23 comprises a left mold segment 24 and a right mold segment 25. The mold segments 24, 25 of the mold halves 22, 23 can be moved together by a drive (not shown), so that the two mold segments 24 and 25 of the upper mold half 23 and the mold segments 24 and 25 of the lower mold half 22 are adjacent one another. The drive may also serve to move apart the mold segments 24 and 25.

The mold halves 22, 23 have a plate region 26 and a mold region 27. The plate region 26 serves to transmit the force required to shape the folds 14 in accordance with FIG. 1. It may include mounting elements (not shown), e.g., grooves, threads, or hooks, so that the mold halves 22, 23 can be mounted, e.g., in a press. The mold region 27 has peaks 28 and valleys 29 describing the folds 14 according to FIG. 1. The peaks 28 of the lower mold half 22 are arranged over the valleys 29 of the upper mold half 23 and the valleys 29 of the lower mold half 22 are arranged over the peaks 28 of the upper mold half 23. This makes it possible to set the mold halves 22, 23 on top of one another to produce the folds 14 of the filter medium 11.

Further components of device 21 are two voltage terminals 30 and a rod guide element 31. The voltage terminals 30 are connected to rod 13 in accordance with FIG. 1 after piercing to generate a voltage in rod 13 to heat rod 13. The voltage terminals 30 are acvantageously designed as a variable power supply, so as to be able to apply different voltages and amperages, since these quantities must be adjusted as a function of the material and the cross sectional area 18 of the rod 13. These adjustments can be made, for example, directly on the generator or on a transformer.

The rod guide 31 is arranged such that the rod 13 receives sufficient guidance and does not buckle as it is being pushed through the pleat surfaces of the filter medium. The rod guide 31 can be fixed or movable.

Figure 4:
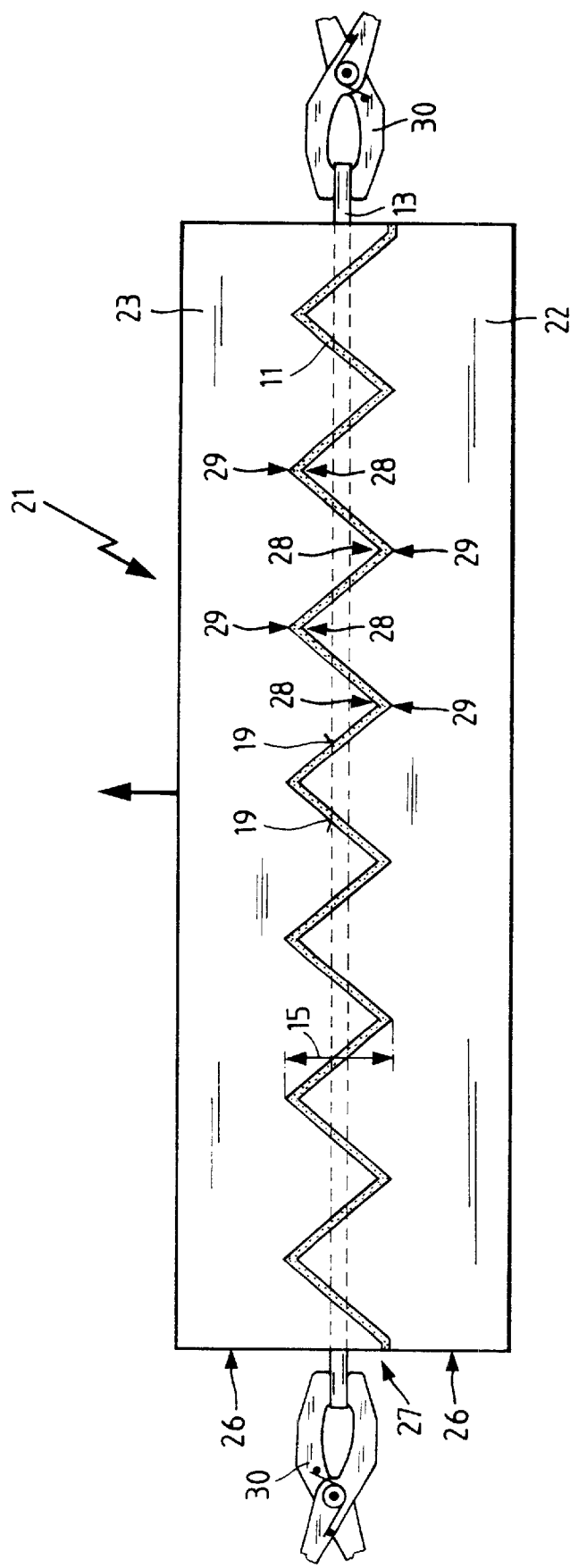
FIG. 4 shows a front elevation of the device of FIG. 3.

FIG. 4 is a front elevation of device 21. The upper mold half 23 and the lower mold half 22 are shown in their closed position with the filter medium 11 placed between the closed mold halves 22, 23. The closed position of the mold halves 22, 23 gives the filter medium 11 its folds 14. In this closed position, rod 13 is pushed through the filter medium 11. Subsequently, the voltage terminals 30 are connected to the rod 13 and a voltage is applied. This voltage causes rod 13 to heat up and to melt together with the filter medium 11 at joints 19. After joints 19 and rod 13 have sufficiently cooled to form a stable connection, the upper and lower mold halves 22, 23 are separated, so that the filter element 10 can be removed. To separate the mold halves 22, 23, one mold half 22, 23 may be stationary and the respective other mold half 22, 23 may be movable, or both mold halves 22, 23 may be movable.

Figure 5:
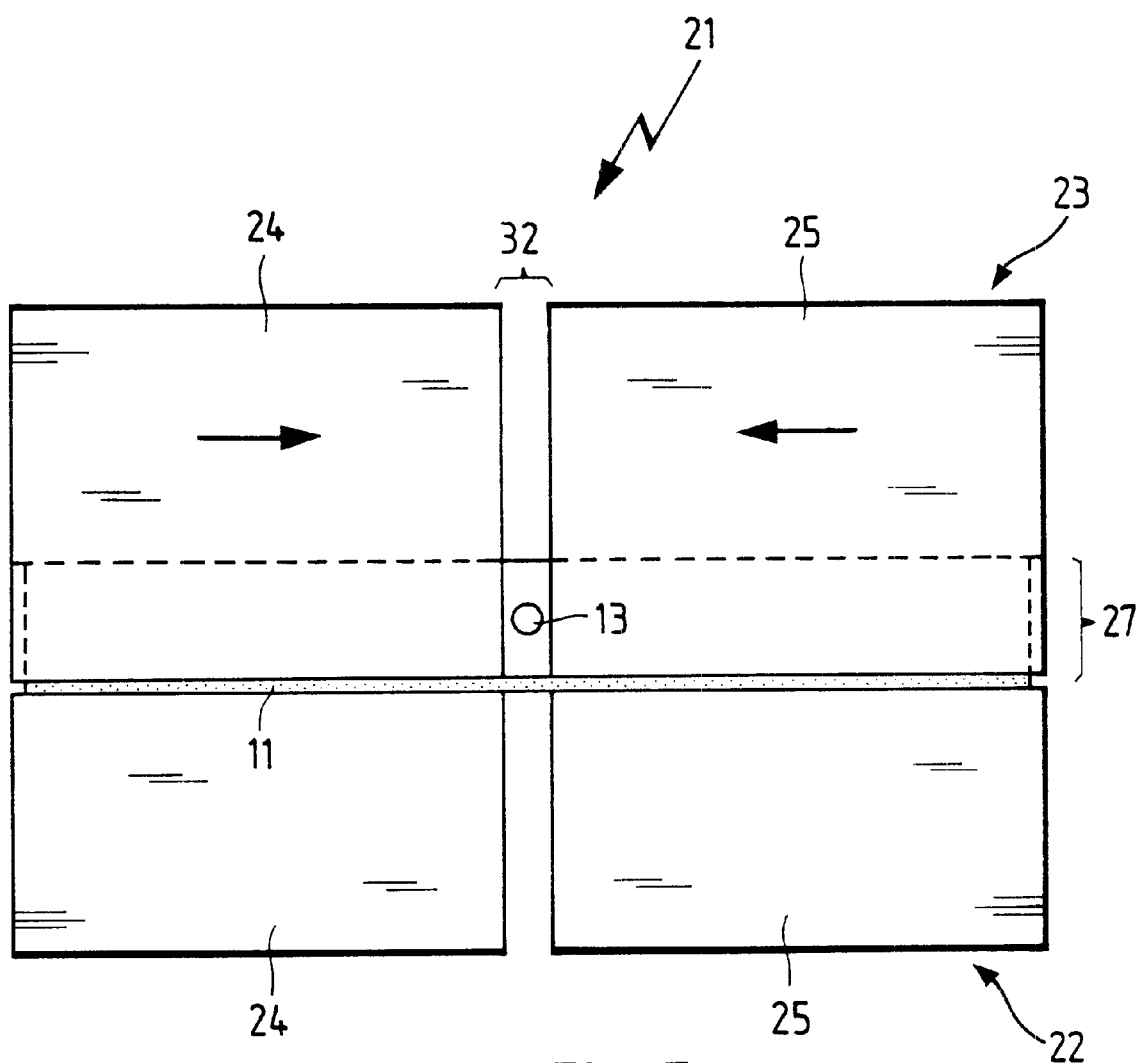
FIG. 5 shows a side elevation of the device.

FIG. 5 is a side elevation of device 21 with inserted filter medium 11 in its closed position. The mold segments 24, 25 are shown spaced apart with a gap 32 between them. Gap 32 between mold segments 24, 25 in relation to one another is selected such that the rod 13 can be pushed through without creating excessive frictional forces or without excessively deforming the filter medium 11. Gap 32 may always be present, even during folding, or may be produced only after folding by moving the mold segments 24 and 25 slightly apart from each other.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element for purifying a fluid comprising:
   at least one filter medium having folds defining pleat surfaces and end faces;
   an enclosure member applied to each end face of the folds; and
   at least one support rod which pierces the pleat surfaces of the folds, wherein said at least one support rod and said filter medium are joined at melt-sealed joints, wherein said melt-sealed joints are formed by either melting the support rod to the filter medium, or by melting the filter medium to the support rod.

2. A filter element as claimed in claim 1, wherein the folds of the filter medium are zigzag-shaped and have a defined fold height.

3. A filter element as claimed in claim 2, wherein said at least one support rod pierced the pleat surfaces of the filter medium approximately centrally of the fold height.

4. A filter element as claimed in claim 1, wherein the filter medium is a synthetic, nonwoven fabric web.

5. A filter element as claimed in claim 1, wherein said at least one support rod has a round cross sectional area.

6. A filter element as claimed in claim 1, wherein said at least one support rod is electrically conductive.

7. A filter element as claimed in claim 1, wherein said at least one support rod is made of a synthetic resin material.

8. A process for producing a filter element in which joints between a pleated filter medium and a support rod piercing pleat surfaces of the filter medium are melting zones in which the rod is melted to the filter medium or the filter medium is melted to the rod, said process comprising placing the filter medium in a pleat folding device, said pleat folding device having a recess through which the rod pierces the filter medium, passing a rod through said recess to pierce the pleat surfaces of the filter medium, and connecting the rod to a voltage source and passing an electric current through the rod to generate heat and melt the rod to the filter medium or the filter medium to the rod.

* * * * *